United States Patent
Mukundan et al.

(10) Patent No.: US 11,113,373 B2
(45) Date of Patent: Sep. 7, 2021

(54) UNLOCKING ELECTRONIC DEVICES USING TOUCH-BASED SENSORS

(71) Applicant: HEWLETT-PACKARD DEVELOPMENT COMPANY, L.P., Houston, TX (US)

(72) Inventors: Sudish Mukundan, San Diego, CA (US); Christopher Charles Kruger, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 561 days.

(21) Appl. No.: 16/074,456

(22) PCT Filed: Oct. 6, 2016

(86) PCT No.: PCT/US2016/055802
§ 371 (c)(1),
(2) Date: Aug. 1, 2018

(87) PCT Pub. No.: WO2018/067160
PCT Pub. Date: Apr. 12, 2018

(65) Prior Publication Data
US 2019/0065715 A1    Feb. 28, 2019

(51) Int. Cl.
*G06F 7/04* (2006.01)
*G06F 12/14* (2006.01)
(Continued)

(52) U.S. Cl.
CPC .............. *G06F 21/32* (2013.01); *G06F 3/044* (2013.01); *G06F 3/0488* (2013.01)

(58) Field of Classification Search
CPC ........ G06F 21/32; G06F 3/044; G06F 3/0488; H04W 12/06; H04W 12/63; H04W 12/64; H04W 12/65; H04L 63/0861
See application file for complete search history.

(56) References Cited

U.S. PATENT DOCUMENTS 8,311,514 B2    11/2012  Bandyopadhyay et al.
8,560,004 B1 *  10/2013  Tsvetkov ............... H04M 1/67
                                                      455/550.1
(Continued)

FOREIGN PATENT DOCUMENTS

CN        102779015 A     11/2012
CN        103167151 A      6/2013
(Continued)

OTHER PUBLICATIONS

Yang et al., "Efficient In-Pocket Detection with Mobile Phones", Proceedings of the 2013 ACM Conference on Pervasive and Ubiquitous Computing Adjunct Publication, Sep. 8-12, 2013, pp. 31-34.

*Primary Examiner* — Trong H Nguyen
(74) *Attorney, Agent, or Firm* — Trop, Pruner & Hu PC (57) ABSTRACT

In some examples, an electronic device includes a touch-based sensor, a proximity sensor, and a processor to in response to determining, based on output from the proximity sensor, that the electronic device is in an enclosed space: determine whether a specified number of multiple touches of the touch-based sensor has been detected by the touch-based sensor, and in response to determining that the specified number of multiple touches of the touch-based sensor has been detected by the touch-based sensor, unlock the electronic device.

20 Claims, 5 Drawing Sheets

(51) Int. Cl.

| | | |
|---|---|---|
| *G06F 12/00* | (2006.01) | |
| *G06F 13/00* | (2006.01) | |
| *G11C 7/00* | (2006.01) | |
| *G06F 21/32* | (2013.01) | |
| *G06F 3/0488* | (2013.01) | |
| *G06F 3/044* | (2006.01) | |

(56) References Cited

U.S. PATENT DOCUMENTS

| | | | |
|---|---|---|---|
| 9,244,888 B2 | 1/2016 | Bernheim Brush et al. | |
| 9,360,953 B2 | 6/2016 | Dang et al. | |
| 2009/0008234 A1 | 1/2009 | Tolbert et al. | |
| 2009/0169070 A1* | 7/2009 | Fadell | G06F 21/32 382/124 |
| 2010/0099394 A1* | 4/2010 | Hainzl | H04W 52/027 455/418 |
| 2012/0071149 A1* | 3/2012 | Bandyopadhyay | H04M 1/67 455/418 |
| 2015/0054764 A1* | 2/2015 | Kim | G06F 3/04883 345/173 |
| 2016/0063230 A1* | 3/2016 | Alten | H04L 63/0861 726/28 |
| 2016/0188023 A1 | 6/2016 | Chang et al. | |
| 2016/0212710 A1 | 7/2016 | Ting et al. | |
| 2016/0366273 A1* | 12/2016 | Kobayashi | H04M 1/247 |

FOREIGN PATENT DOCUMENTS

| | | |
|---|---|---|
| CN | 104007882 A | 8/2014 |
| CN | 104573449 A | 4/2015 |
| EP | 2079011 A1 | 7/2009 |
| WO | 2015105326 A1 | 7/2015 |

\* cited by examiner

UNLOCKING ELECTRONIC DEVICES USING TOUCH-BASED SENSORS

BACKGROUND

An electronic device can include a display device to display information, and a user input device to allow a user to make inputs to the electronic device. The user input device can include a touch-based input device, which can be in the form of a touchscreen display device, a touch pad, and so forth. In other examples, the user input device can include a keyboard, a pointer device, and so forth.

BRIEF DESCRIPTION OF THE DRAWINGS

Some implementations of the present disclosure are described with respect to the following figures.

DETAILED DESCRIPTION

In the present disclosure, the article "a," "an", or "the" can be used to refer to a singular element, or alternatively to multiple elements unless the context clearly indicates otherwise. Also, the term "includes," "including," "comprises," "comprising," "have," or "having" is open ended and specifies the presence of the stated element(s), but does not preclude the presence or addition of other elements.

Examples of electronic devices include notebook computers, tablet computers, convertible computers that can be converted between use as a notebook computer and use as a tablet computer, handheld devices (such as smartphones and the like), wearable devices (such as smart watches, smart eyeglasses, head-mounted devices), game appliances, and so forth. An electronic device can include a touchscreen display device or other touch-based input device that can receive touch-based inputs, such as from a user's finger or fingers, or from a stylus. When not in use, the electronic device is locked to prevent inadvertent inputs from being made with the touch-based input device.

A way to unlock an electronic device is by use of a fingerprint sensor. The fingerprint sensor is able to sense a user's fingerprint when a user touches the user's finger on the fingerprint sensor. When the sensed fingerprint matches a target fingerprint, then the electronic device can unlock the electronic device to allow user inputs to be made through a touch-based input device and/or another user input device.

In some cases, an electronic device may be carried in an enclosed space, such as in a user's pocket, a bag, a purse, or any other container. As used here, an "enclosed space" can refer to a space that is surrounded by a wall or walls of a containing structure, such that there is no visibility or reduced visibility of an object, such as an electronic device, in the enclosed space. While the electronic device is in the enclosed space, the user cannot see the electronic device or can see just a small part of the electronic device. As a result, when the user's hand reaches into the enclosed space, the user may inadvertently touch the fingerprint sensor of the electronic device, which may cause the electronic device to be inadvertently unlocked while the electronic device remains in the enclosed space.

In accordance with some implementations of the present disclosure, techniques or mechanisms are provided to activate a count-based unlocking process for an electronic device in response to determining, based on an output of a proximity sensor, that the electronic device is in an enclosed space. The count-based unlocking process determines whether a specified number of multiple touches of a fingerprint sensor produce fingerprint matches to a target fingerprint. In response to determining that the specified number of multiple touches of the fingerprint sensor have produced fingerprint matches to the target fingerprint, the count-based unlocking process unlocks the electronic device.

More generally, a count-based unlocking process determines whether a specified number of multiple touches of the touch-based sensor has been detected by the touch-based sensor, and in response to determining that the specified number of multiple touches of the touch-based sensor has been detected by the touch-based sensor, the count-based unlocking process unlocks the electronic device. In some examples, each touch of the touch-based sensor can produce an instance of a representation of a user's fingerprint to be compared to a target fingerprint. In other examples, each touch of the touch-based sensor produces an indication of a touch. In such latter examples, a user's touch of the touch-based sensor is the event that is used for unlocking an electronic device.

Figure 1:
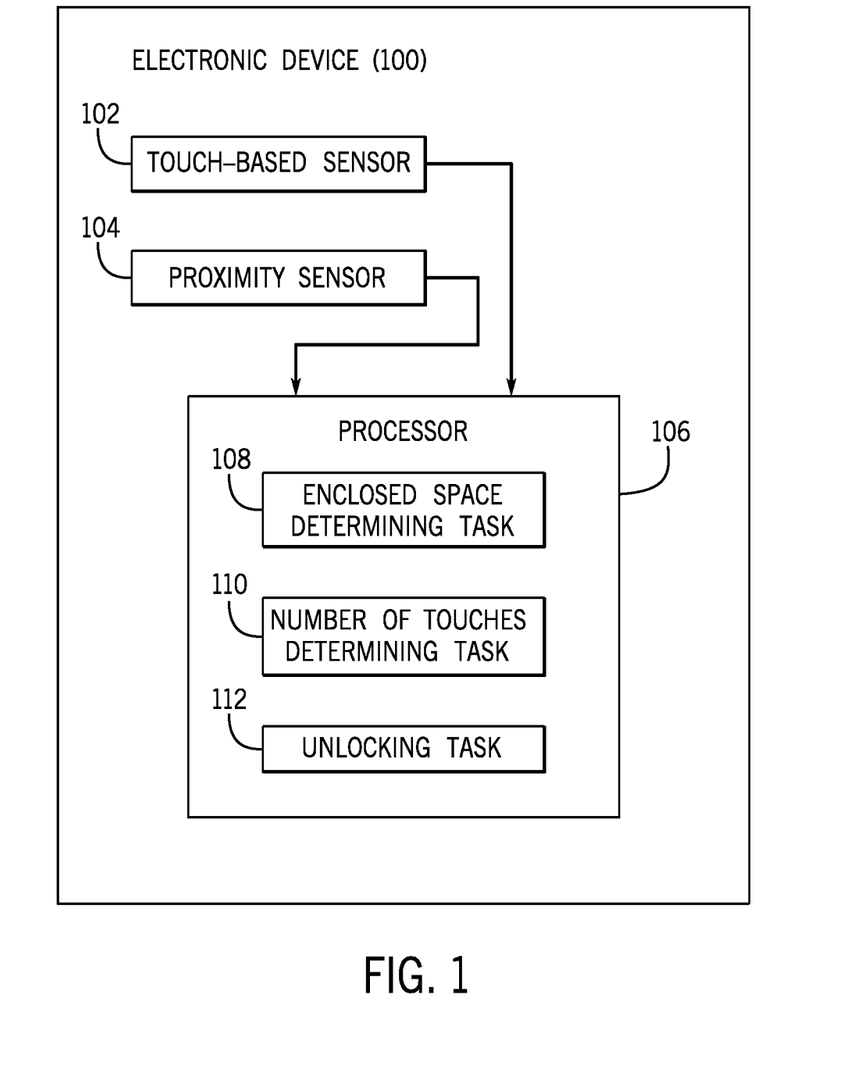
FIG. 1 is a block diagram of an electronic device that includes an unlocking mechanism according to some examples.

FIG. 1 is a block diagram of an example electronic device 100, which includes a touch-based sensor 102, a proximity sensor 104, and a processor 106. The touch-based sensor 102 is able to detect touch of a user's finger or fingers. For example, the touch-based sensor 102 can be a capacitive touch-based sensor that is able to detect a change in capacitance due to an object, such as a user's finger, being placed on a sensing area of the touch-based sensor 102. In other examples, the touch-based sensor 102 can include an optical sensing element to sense touch of an object to a sensing area of the touch-based sensor 102. The sensing area of the touch-based sensor 102 can be a defined area on a housing of the electronic device 100, an area on a button of the electronic device 100, or an area on a touchscreen display device of the electronic device 100.

In examples where the touch-based sensor 102 sensed a fingerprint of a user, the touch-based sensor 102 can measure the various points of contact made by the user's finger on the sensing area of the touch-based sensor 102, and can provide such measurements to the processor 106 for deriving a pattern that represents the user's fingerprint. In other examples, the touch-based sensor 102 can sense a user's touch made on the sensing area. The sensed touch is provided as an indication to the processor 106.

The proximity sensor 104 is able to detect the proximity of the electronic device 100 to another object. An output of the proximity sensor 104 is provided to the processor 106. In some examples, the proximity sensor 104 can include an infrared (IR) sensor or another type of optical sensor. In further examples, the proximity sensor 104 can be a capacitive-based proximity sensor. If the proximity sensor 104 includes an optical sensor, the optical sensor can be used to detect, based on light reflected from an object, how far the object is away from the electronic device 100. This distance measurement based on measuring reflected light can be used to determine whether the electronic device 100 is located in an enclosed space. In some examples, there can be multiple optical sensors that are part of the proximity sensor 104, where the multiple optical sensors are placed at different parts of the electronic device 100 so that proximity of objects to different parts of the electronic device 100 can be determined using the multiple optical sensors. A capacitive-based proximity sensor that is used to implement the proximity sensor 104 can detect proximity of an object based on the measured capacitance. In further examples, the proximity sensor 104 can include different types of sensors, such as optical sensors and capacitive-based sensors.

The processor 106 uses the output of the proximity sensor 104 to perform an enclosed space determining task 108, which determines, based on the output of the proximity sensor 104, whether the electronic device 100 is in an enclosed space. In response to determining that the electronic device 100 is in an enclosed space, the processor 106 performs a number of touches determining task 110, which determines whether a specified number of multiple touches of the touch-based sensor 102 has been detected by the touch-based sensor 102. In response to determining that the specified number of multiple touches of the touch-based sensor 102 has been detected, the processor 106 performs an unlocking task 112 to unlock the electronic device 100.

In further examples, the electronic device 100 can include another sensor, such as an accelerometer or another sensor that can detect the motion or an orientation of the electronic device 100. Motion and/or orientation of the electronic device 100 can also be taken into account for determining whether the electronic device 100 is located in an enclosed space, or is actively being used, such as when the electronic device 100 is held in a user's hand (or hands).

Unlocking the electronic device 100 can refer to activating certain electronic components of the electronic device 100, such as a display device (e.g., a touchscreen display device or a non-touchscreen display device) and/or a user input device. The user input device can be a touchscreen display device, or alternatively, can be a different user input device, such as a keyboard, a pointer device, a touchpad, and so forth. Unlocking a display device can refer to turning on the display device such that the display device displays an image, and in the case of a touchscreen display device, the touchscreen display device can accept touch inputs. Unlocking a user input device can refer to enabling the user input device to receive a user input. In the locked mode, the user input device would not be able to receive a user input, or otherwise, may receive a user input, but the electronic device 100 would disregard the user input.

The processor 106 can include any or some combination of the following: a microprocessor, a core of a multi-core microprocessor, a microcontroller, a programmable gate array, a programmable integrated circuit device, or another hardware processing circuit. In further examples, the processor 106 can include a combination of a hardware processing circuit and machine-readable instructions executable on the hardware processing circuit.

Figure 2:
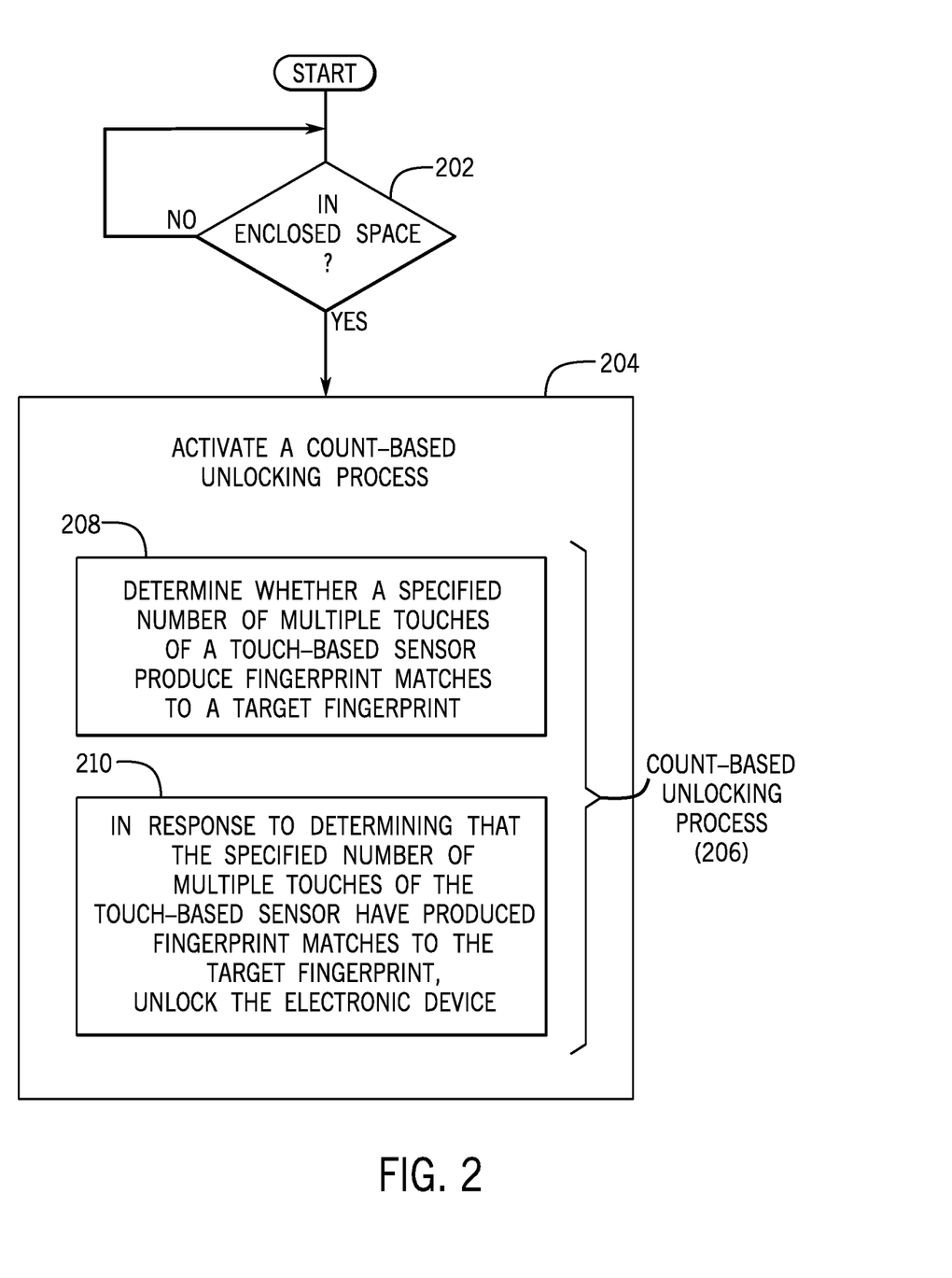
FIG. 2 is a flow diagram of a process of unlocking an electronic device according to some examples.

FIG. 2 is a flow diagram of a process that can be performed by the processor 106 of FIG. 1, for example. The process of FIG. 2 includes determining (at 202) whether the electronic device 100 is in an enclosed space. If the electronic device 100 is not in an enclosed space, the process of FIG. 2 continues to check for information, such as from the proximity sensor 104, whether the electronic device 100 is in an enclosed space.

In response to determining that the electronic device 100 is in an enclosed space, the process of FIG. 2 activates (at 204) a count-based unlocking process 206. The count-based unlocking process 206 when activated determines (at 208) whether a specified number of multiple touches of the touch-based sensor 102 produce fingerprint matches to a target fingerprint. The multiple touches of the touch-based sensor 102 include a user touching the sensing area of the touch-based sensor 102 with the user's finger, followed by lifting the user's finger from the sensing area of the touch-based sensor 102, followed by the user's finger again touching the sensing area of the touch-based sensor 102. The iterative touching, disengaging, touching, disengaging, can be performed a number of times.

In some examples, with each touching of the sensing area of the touch-based sensor 102, the touch-based sensor 102 acquires measurements (e.g., capacitive measurements and/or optical measurements) of contact points of the user's finger, and provides data of such measurements to the processor 106 of the electronic device 100. The measurements make up a pattern of the user's fingerprint that can be compared to a target fingerprint, which is stored in a storage medium of the electronic device 100. This target fingerprint can be established by the user as part of a fingerprint setup procedure of the electronic device 100, where the electronic device 100 can prompt the user to touch the touch-based sensor 102 to acquire the fingerprint that is to be stored as the target fingerprint.

Each successive touch of the touch-based sensor 102 following disengagement of the user's finger from the touch-based sensor 102 produces another set of measurements of the contact points of the user's finger, which measurements are then provided as a pattern for comparing to the target fingerprint. A count can be maintained of the number of fingerprint matches to the target fingerprint produced by the corresponding multiple touches of the touch-based sensor 102 by the user's finger. If this count of the number of successful fingerprint matches is equal to or exceeds a specified count threshold, then the count-based unlocking process 106 is able to unlock the electronic device 100. As depicted in FIG. 2, in response to determining that the specified number of multiple touches of the touch-based sensor 102 have produced fingerprint matches to the target fingerprint, the count-based unlocking process 206 unlocks (at 210) the electronic device 100.

Figure 3:
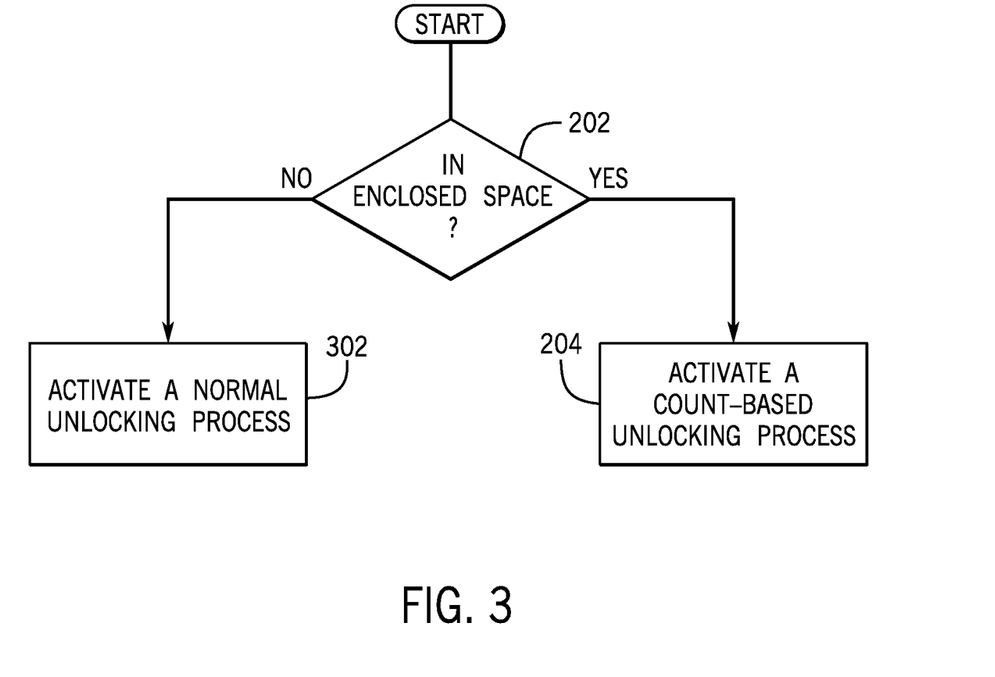
FIG. 3 is a flow diagram of a process of unlocking an electronic device according to further examples.

FIG. 3 is a flow diagram of a process that can be performed by the processor 106 of FIG. 1 according to alternative examples. The process of FIG. 3 determines (at 202) whether the electronic device 100 is in the enclosed space. If so, the process of FIG. 3 activates (at 204) a count-based unlocking process, such as the count-based unlocking process 206 of FIG. 2.

However, if the process of FIG. 3 determines that the electronic device 100 is not in an enclosed space, the process of FIG. 3 activates (at 302) a normal unlocking process, which is an unlocking process that is different from the count-based unlocking process. The normal unlocking process does not maintain a count of the number of touches, or more specifically according to some examples, of a number of fingerprint matches to a target fingerprint. Instead, the normal unlocking process can unlock the electronic device 100 in response to a single (first) touch of the touch-based sensor 102, or more specifically in some examples, to a single (first) match of a user's fingerprint to the target fingerprint.

By using the process according to FIG. 3, when the electronic device 100 is not in an enclosed space (such as when the electronic device 100) is being held by a user's hand (or hands) or when the electronic device 100 is laying on a desk or other platform, a user can quickly unlock the electronic device with just a single touch of the touch-based sensor 102. On the other hand, the likelihood of inadvertently unlocking the electronic device 100 while the electronic device 100 is in an enclosed space based on inadvertently touching the touch-based sensor 102 is reduced by using the count-based unlocking process.

Figure 4:
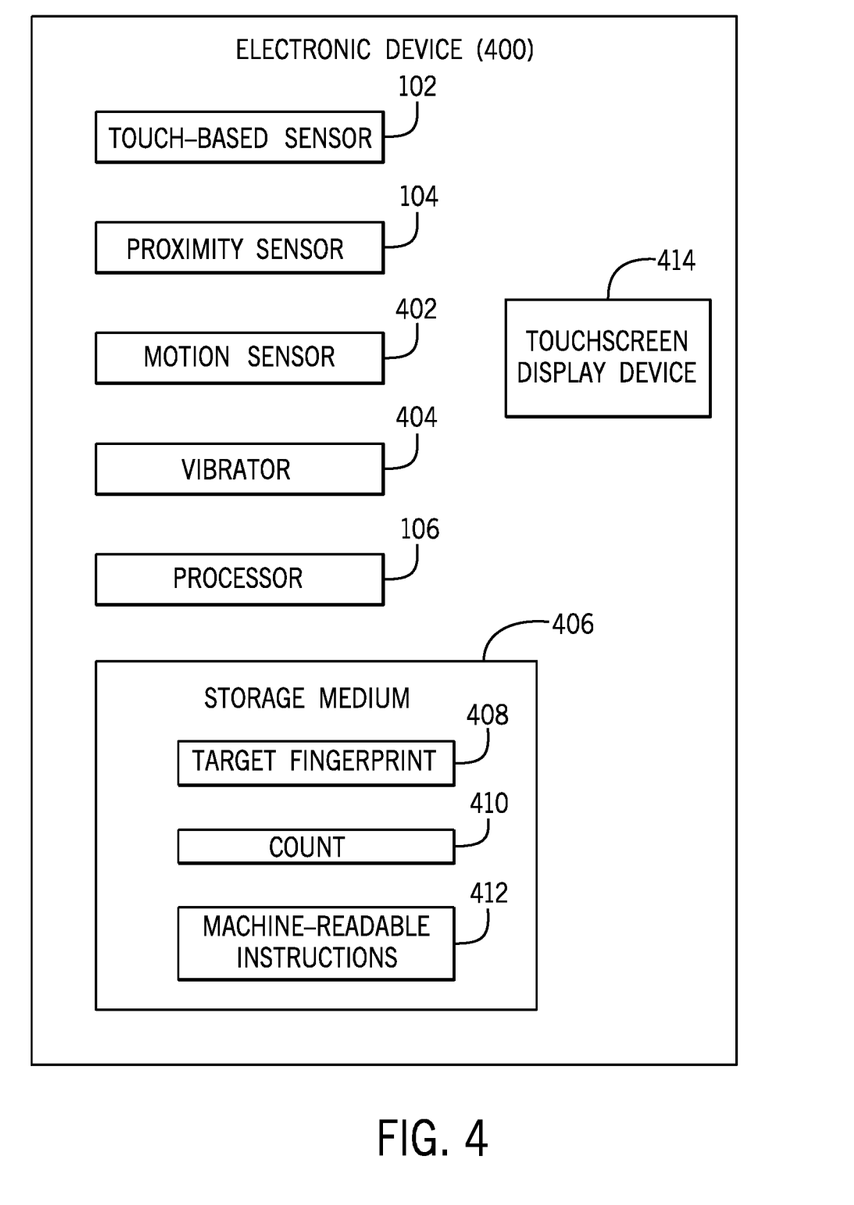
FIG. 4 is a block diagram of an electronic device that includes an unlocking mechanism according to further examples.

FIG. 4 is a block diagram of an example electronic device 400 according to other implementations. The electronic device 400 includes a touch-based sensor 102, a proximity sensor 104, and a processor 106, similar to corresponding components shown in FIG. 1. In addition, the electronic device 400 includes a motion sensor 402, such as an accelerometer.

Further, the electronic device 400 includes a vibrator 404, which can be activated to produce vibration of the electronic device 400. In some examples, a user touching the touch-based sensor 102 can trigger activation of the vibrator 404, to provide a tactile feedback to the user that the user has touched the touch-based sensor 102. This tactile feedback can make the user aware that the user may have inadvertently touched the touch-based sensor 102, such as when the electronic device 400 is in an enclosed space.

The electronic device 400 also includes a storage medium 406, which can be implemented as a memory or other type of storage medium. The storage medium 406 stores a target fingerprint 408, against which a pattern representing an acquired fingerprint of a user is compared to determine whether there is a fingerprint match. The storage medium 406 also stores a count 410 of a number of fingerprint matches (or more generally, a number of touches of the touch-based sensor 102). In addition, the storage medium 406 stores machine-readable instructions 412 that can be executed on the processor 106 to perform tasks as described herein, such as tasks shown in FIGS. 1-3.

In some examples, a user or other entity (such as machine-readable instructions) can configure a parameter that represents the specified number of touches of a touch-based sensor that is to cause unlocking of the electronic device. For example, the user can open an application or another program that allows the user to enter the specified number, or to select the specified number from several choices. Selecting the specified number to a higher number reduces the likelihood of inadvertent unlocking of an electronic device based on inadvertent user touches of the touch-based sensor.

The electronic device 400 can also include a touchscreen display device 414, which can be activated in response to unlocking of the electronic device 400 according to some implementations.

Figure 5:
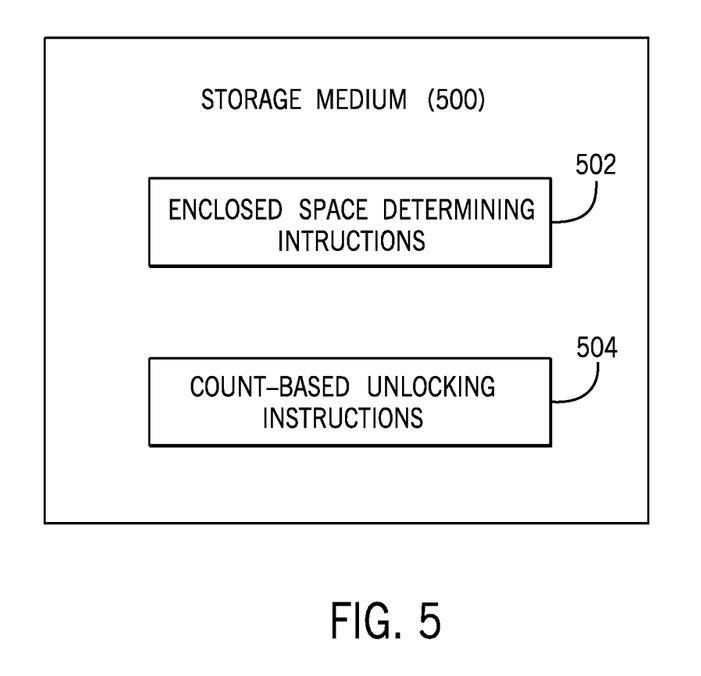
FIG. 5 is a block diagram of a storage medium storing instructions according to some examples.

FIG. 5 is a block diagram of a non-transitory machine-readable or computer-readable storage medium 500 that stores instructions that can be executed by a processor 106 of an electronic device (e.g., 100 or 400). In FIG. 5, the machine-readable instructions include enclosed space determining instructions 502 to determine, based on an output of a proximity sensor (e.g., 104) whether the electronic device is in an enclosed space. The machine-readable instructions further include count-based unlocking instructions 504 that are to, in response to determining that the electronic device is in an enclosed space, activate a count-based unlocking process of the electronic device, the count-based unlocking process including a process to unlock the electronic device in response to detecting a specified number of multiple touches of a touch-based sensor (e.g., 102).

The storage medium 500 of FIG. 5 or the storage medium 406 of FIG. 4 can be implemented using any or some combination of the following: a semiconductor memory device such as a dynamic or static random access memory (DRAM or SRAM), an erasable and programmable read-only memory (EPROM), an electrically erasable and programmable read-only memory (EEPROM) and a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
    a touch-based sensor;
    a proximity sensor; and
    a processor to:
        determine, based on output from the proximity sensor, whether the electronic device is in an enclosed space;
        in response to determining that the electronic device is in the enclosed space, activate a count-based unlocking process that comprises:
            counting a number of multiple touches of the touch-based sensor,
            determining, based on the counting, whether a specified number of the multiple touches of the touch-based sensor has been detected by the touch-based sensor, and
            in response to determining that the specified number of the multiple touches of the touch-based sensor has been detected by the touch-based sensor, unlock the electronic device that is determined to be in the enclosed space; and
        in response to determining that the electronic device is not in the enclosed space, activate a different unlocking process that comprises:
            unlocking the electronic device determined to not be in the enclosed space in response to a single touch of the touch-based sensor.

2. The electronic device of claim 1, wherein the touch-based sensor is to sense a fingerprint of a user, and wherein the detecting of the specified number of the multiple touches comprises detecting multiple instances of the fingerprint of the user.

3. The electronic device of claim 2, wherein the detecting of the specified number of the multiple touches comprises detecting that the multiple instances of the fingerprint of the user each match a target fingerprint.

4. The electronic device of claim 1, wherein the unlocking of the electronic device in response to determining the specified number of the multiple touches or in response to the single touch comprises unlocking a touch-screen display device of the electronic device to accept touch-based inputs on the touch-screen display device.

5. The electronic device of claim 1, wherein the determining whether the electronic device is in the enclosed space is based on detecting light by an optical sensor of the proximity sensor.

6. The electronic device of claim 1, wherein the determining whether the electronic device is in the enclosed space is based on detecting a distance of the electronic device to an external object.

7. The electronic device of claim 1, further comprising a vibrator, wherein the processor is to, in response to the determining that the electronic device is in the enclosed space, activate the vibrator responsive to a user touch of the touch-based sensor.

8. The electronic device of claim 1, wherein the processor is to determine that the specified number of the multiple touches of the touch-based sensor has been detected by the touch-based sensor based on comparing a count produced by the counting to a threshold.

9. A non-transitory machine-readable storage medium storing instructions that upon execution by an electronic device cause the electronic device to:
   determine, based on an output of a proximity sensor, whether the electronic device is in an enclosed space;
   in response to determining that the electronic device is in the enclosed space, activate a count-based unlocking process of the electronic device, the count-based unlocking process comprising:
      counting a number of multiple touches of a touch-based sensor,
      determining, based on the counting, whether a specified number of the multiple touches of the touch-based sensor has been detected by the touch-based sensor, and
      in response to determining that the specified number of the multiple touches of the touch-based sensor has been detected by the touch-based sensor, unlock the electronic device that is determined to be in the enclosed space; and
   in response to determining that the electronic device is not in the enclosed space, activate a different unlocking process that comprises:
      unlocking the electronic device determined to not be in the enclosed space in response to a single touch of the touch-based sensor.

10. The non-transitory machine-readable storage medium of claim 9, wherein the instructions upon execution by the electronic device cause the electronic device to:
   determine that the specified number of the multiple touches of the touch-based sensor has been detected by the touch-based sensor based on comparing a count produced by the counting to a threshold.

11. The non-transitory machine-readable storage medium of claim 9, wherein the instructions upon execution by the electronic device cause the electronic device to receive, from the touch-based sensor, data representing a fingerprint of a user in response to each touch of the multiple touches, and wherein the detecting of the specified number of the multiple touches comprises detecting multiple instances of the fingerprint of the user that matches a target fingerprint.

12. The non-transitory machine-readable storage medium of claim 9, wherein the instructions upon execution by the electronic device cause the electronic device to receive a user selection of the specified number.

13. The non-transitory machine-readable storage medium of claim 9, wherein the unlocking of the electronic device in response to determining the specified number of the multiple touches or in response to the single touch comprises unlocking a touch-sensitive display device to accept touch-based inputs.

14. The non-transitory machine-readable storage medium of claim 9, wherein the determining whether the electronic device is in the enclosed space is based on detecting light by an optical sensor of the proximity sensor.

15. The non-transitory machine-readable storage medium of claim 9, wherein the determining whether the electronic device is in the enclosed space is based on detecting a distance of the electronic device to an external object.

16. The non-transitory machine-readable storage medium of claim 9, wherein the instructions upon execution by the electronic device cause the electronic device to:
   in response to determining that the electronic device is in the enclosed space, activate a vibrator of the electronic device responsive to a user touch of the touch-based sensor.

17. A method of an electronic device, comprising:
   in response to determining, based on output from a proximity sensor, that the electronic device is in an enclosed space, activating a count-based unlocking process that comprises:
      counting a number of multiple touches of a touch-based sensor,
      determining, based on the counting, whether a specified number of the multiple touches of the touch-based sensor has been detected by the touch-based sensor, and
      in response to determining that the specified number of the multiple touches of the touch-based sensor has been detected by the touch-based sensor, unlocking the electronic device that is determined to be in the enclosed space; and
   in response to determining that the electronic device is not in the enclosed space, activating a different unlocking process that comprises:
      unlocking the electronic device determined to not be in the enclosed space in response to a single touch of the touch-based sensor.

18. The method of claim 17, wherein the determining that the specified number of the multiple touches of the touch-based sensor has been detected by the touch-based sensor is based on comparing a count produced by the counting to a threshold.

19. The method of claim 17, further comprising:
   in response to determining that the electronic device is in the enclosed space, activating a vibrator of the electronic device responsive to a user touch of the touch-based sensor.

20. The method of claim 17, wherein the counting comprises incrementing a count in responsive to each touch of the multiple touches of the touch-based sensor producing a fingerprint of a user that matches a target fingerprint.

* * * * *